United States Patent [19]

Livet

[11] 4,427,176
[45] Jan. 24, 1984

[54] MANUALLY CONTROLLED FLUID VALVE
[75] Inventor: Jean Livet, Geneva, Switzerland
[73] Assignee: Sperry Vickers Lucifer S. A., Carouge-Geneve, Switzerland
[21] Appl. No.: 262,913
[22] Filed: May 12, 1981
[30] Foreign Application Priority Data
 May 28, 1980 [CH] Switzerland .......................... 4127/80
[51] Int. Cl.³ .................... F16K 31/02; F16K 31/44
[52] U.S. Cl. ....................................... 251/68; 74/529; 251/116; 251/130; 251/138; 251/297
[58] Field of Search .............. 251/68, 111, 114, 115, 251/116, 130, 138, 297; 74/527, 529, 532

[56] References Cited
U.S. PATENT DOCUMENTS

| 2,630,832 | 3/1953 | Lutherer | 251/130 |
| 2,839,929 | 6/1958 | Hurlburt, Jr. | 251/114 |
| 3,134,271 | 5/1964 | Ray | 251/68 |
| 4,342,335 | 8/1982 | Reinicker et al. | 251/297 |

FOREIGN PATENT DOCUMENTS

| 1809562 | 1/1972 | Fed. Rep. of Germany . | |
| 1809561 | 7/1973 | Fed. Rep. of Germany . | |
| 808577 | 2/1959 | United Kingdom | 251/297 |
| 1437061 | 5/1976 | United Kingdom | 251/114 |

Primary Examiner—George L. Walton
Attorney, Agent, or Firm—Emory L. Groff, Jr.

[57] ABSTRACT

The valve consists of a closing device (7) pushed by a spring (8) to press the sealing face (9) against its seat (13). The closing device (7) can only be moved by action on the handle (18) provided the magnetic core (32) is attracted to the left, to enable the rod (35) to move the part (26) against the opposing action of a spring-loaded (39) bush (38). When the handle (18) is then operated, the rod (20) moves the part (26) downwards, which in turn presses down the rod (30) and allows the spring (8) to move the closing device (7) downwards. The part (26) is then locked by the engagement of its lip (42) beneath the end of a pin (40). If the excitation current is interrupted, the core (32) and the part (26) return to their original position, which releases the moving part (26) and the rod (30).

The spring (31) then returns the closing device (7) to the position illustrated.

4 Claims, 7 Drawing Figures

MANUALLY CONTROLLED FLUID VALVE

One is already familiar with manually controlled fluid valves, consisting of a closing device capable of being moved to an active position, against the effect of a return force, and an electrically controlled connection device allowing the closing device to be connected to a manual control device, this connection device comprising at least one moving part allowing the mechanical connection between the closing device and the control device to be respectively made and broken, the movements of this moving part being controlled by an electro-magnetic device.

Valves of this kind are covered, in particular, by German patent No. 1 809 561. In the valves covered by this patent, a sliding control device can be made integral with or independent of a valve wedge, by means of an electro-magnetically controlled coupling device. When the control device is coupled to the wedge, it allows the latter to be moved from its open to its closed position, and vice-versa.

German patent No. 1 809 562 describes a valve having an electromagnetically controlled coupling of the same kind, this coupling being arranged, however, in such a way as to engage the wedge in retaining slots to keep it in one of its positions against the action of a return spring. By moving the coupling device to the inactive position, the valve wedge is released and moves as a result of the action of the return spring.

The purpose of the present invention is to offer a valve which can only be operated with its control device in a certain position and under the control of an electrical current. Unless these two conditions are fulfilled, it is impossible to operate the valve until the two parameters—position of the control device and current status—return to their original required condition. Moreover, when the valve has been operated, it cannot be returned to its first position by the control device, but only by the action of the electrical current.

For this purpose, the valve according to the present invention is characterised by the fact that the moving part and the closing device are shaped in such a way that they can only engage one another when the control device is in a certain position, this moving part being subservient to locking devices which keep it engaged with the closing device once the latter reaches a certain position, these locking devices being activated by the simultaneous effect of the excitation of the electro-magnetic device and the placing of the moving part in a position corresponding to the active position of the closing device.

The attached drawing herewith represents, diagramatically and by way of example, a preferred form of execution of the valve covered by the invention.

Figure 1:
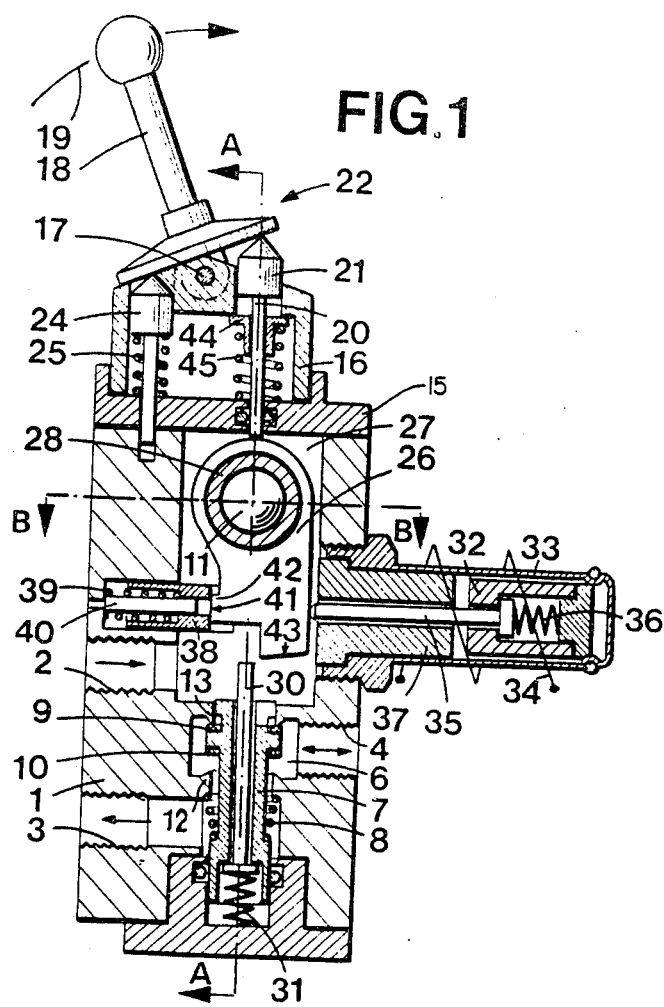
FIG. 1 is a cross-section of this valve.

FIG. 1 shows a three-way valve whose body 1 has a coupling 2 for the entry of fluid under pressure, an exhaust coupling 3, and a coupling 4 for connecting the valve to the user appliance.

The user appliance communicates with a chamber 6 in which a closing device 7 moves, subject to the action of a return spring 8. This closing device has two sealing faces 9 and 10 which are integral with the device 7. These two faces are intended to mate respectively with valve seats 12 and 13.

A plate 15 is fixed to the body 1 by means not illustrated, and supports a cap 16 through which a spindle 17 passes for the articulation of a handle 18. This handle 18 is intended to be moved in the direction of the arrow 19 in order to push down a rod 20 with a head 21. The rod 20 passes through a bush 44 which is pushed by a spring 45 in the direction of the head 21 against the cap 16. The handle 18 and the rod 20 constitute a control device 22. The handle 18 is pushed in the direction of the arrow 19 by a spring 25 pressing against push-rod 24.

Figure 1A:
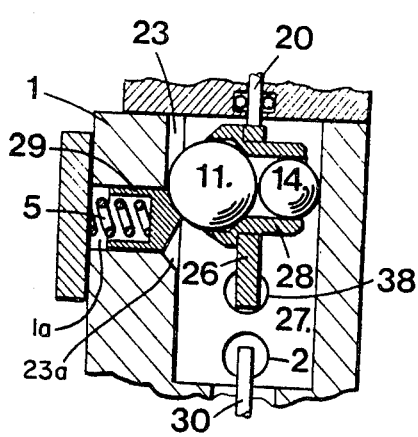
FIGS. 1A and 1B are sections on the lines A—A and B—B of FIG. 1.
Figure 1B:
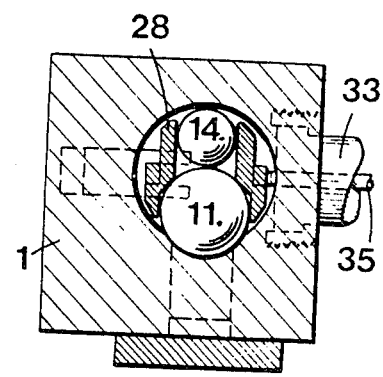

A connection device is provided between the rod 20 and the closing device 7. This connection device consists of a moving part 26 housed in a hollow space 27 inside the valve body 1 in such a way that it can move in an axial direction corresponding to the axis of the rod 20 and can pivot in an axis located transversely to this axial direction. As shown by the sections A—A and B—B in FIG. 1, the part 26 has a bush 28 located in the aforesaid transverse axis, which in this case happens to be perpendicular to the axial direction of movement of part 26. The hollow space has a groove 23 (FIG. 1A) engaging with one of two balls 11 and 14 which are held in the bush 28. The bottom end 23a of the groove 23 communicates with an opening 1a in body 1. A piston 29 is slidably mounted in the opening and is urged by a spring 5 into contact with the ball 11 and has the effect of elastically keeping the part 26 pushed upwards, in contact with the bottom end of the rod 20. The balls 11 and 14 are in contact with each other, and ball 14 locates against the side of the hollow space 27 opposite the groove 23. The hollow space 27 is generally of cylindrical shape, so that the two balls 11 and 14 guide the part 26 in a diametral plane of this space 27.

Figure 3:
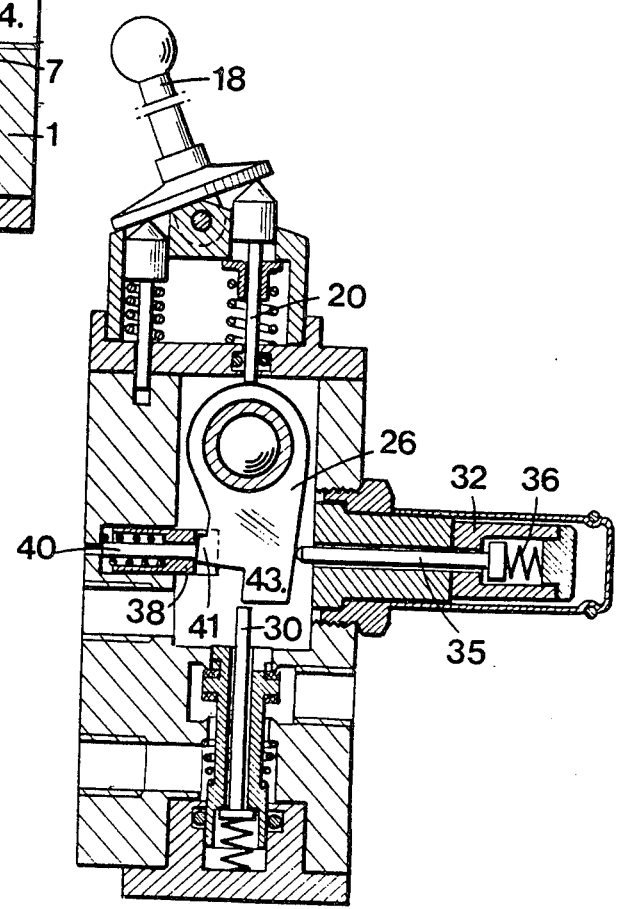

The arrangement described above allows the part 26, on the one hand to move in the direction of the rod 20, and on the other hand to pivot about an axis passing through the centres of the two balls 11 and 14 to occupy the positions shown in FIGS. 1 and 3, where the part 26 respectively prevents and allows the operation of the closing device 7.

The closing device is operated by a rod 30 sliding in an axial bore inside this device and subjected to the action of a spring 31 which exercises a greater force than that of the spring 8.

The pivoting of the moving part 26 is controlled by an electromagnetic device comprising a ferromagnetic core sliding in a brass tube 33 which is surrounded by an electrical winding 34, not shown in detail, since its construction is well known. This core 32 has a rod 35 of non-ferromagnetic material, engaged by a spring-loaded head 36. This rod 35 slides back and forth in a ferromagnetic sleeve 37 integral with the tube 33.

As shown in FIG. 1, the part 26 is pushed against the rod 35 by a spring 39 engaging a bush 38 slidable on a pin 40 fixed rigidly to the valve body 1. This bush 38 engages a detent 41 on the part 26, this detent having a lip 42. The bottom of the moving part 26 is cut out, to give a bearing surface 43.

In order that the closing device 7 may be moved and brought into its active position, it is necessary for the handle 18 to be in the position illustrated in FIG. 1, and for the electromagnetic device to then be excited.

Figure 4:
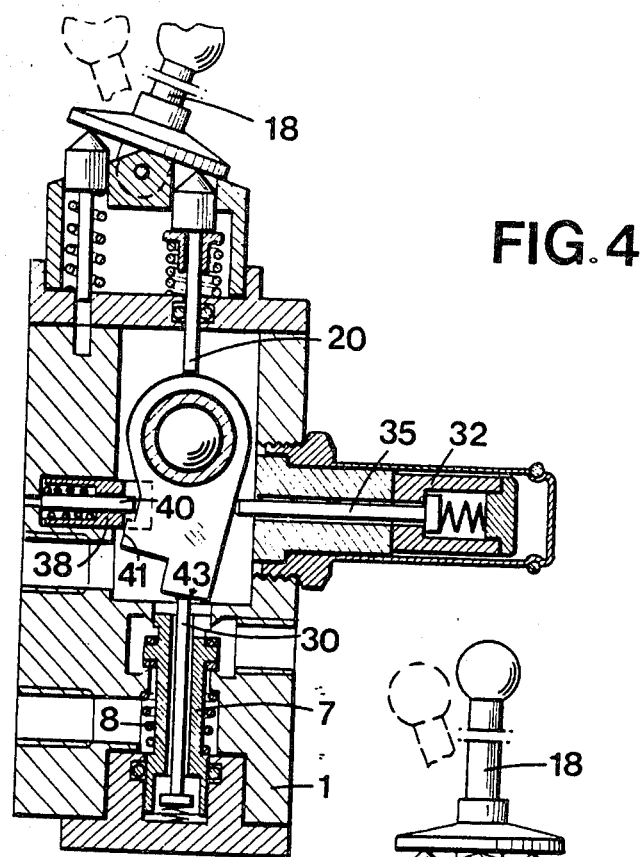

FIGS. 3 and 4 illustrate what happens to the closing device 7 when these conditions are fulfilled.

As shown in FIG. 3, the excitation of the electromagnetic device causes the core 32 to move to the left, which in turn moves the part 26 by means of the spring 36 and the rod 35 against the opposing force of the bush 38. This brings the detent 41 on the part 26 up against the end of the pin 40. At the same time, the bearing surface 43 moves to a position facing the end of the rod 30.

With the moving part 26 in this position, it is sufficient to move over the handle 18 in order to pass from the position illustrated in FIG. 3 to that in FIG. 4. The movement of the handle 18 is transmitted by the rod 20 and causes the moving part 26 to slide downwards, against the retaining action of the piston 29. The bearing surface 43 pushes the rod 30 downwards, so that the head of this rod releases the closing device 7 and allows the latter to be moved by the thrust of the spring 8.

Figure 5:
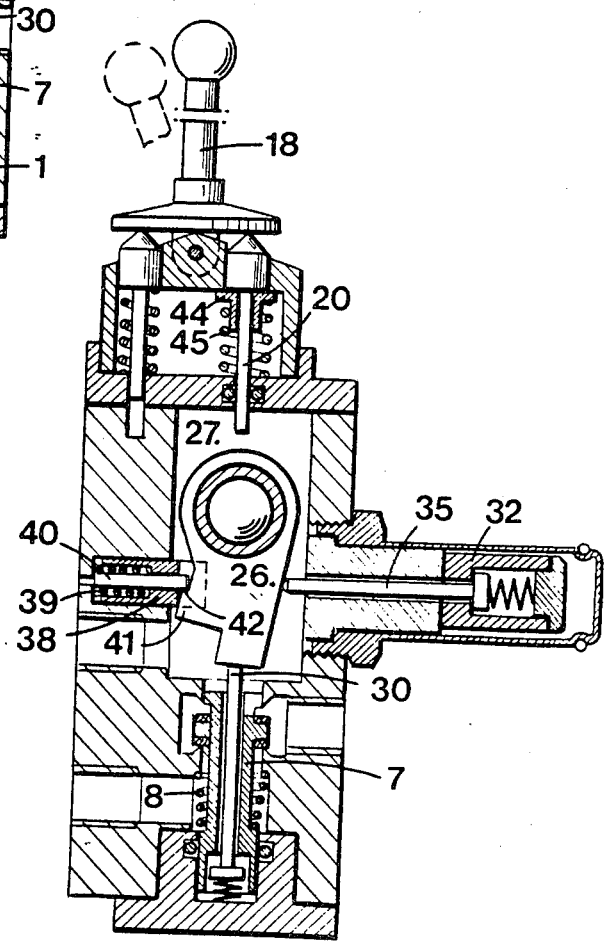

While the part 26 has moved downwards, the detent 41 has slid over the head of the pin 40 and pushed the bush 38 further back into its socket. When the handle 18 is released, as shown in FIG. 5, it is returned to the middle position by the rod 20 whose head 21 is pushed up by a spring 45 engaging a flanged bush 44. The part 26 is pushed slightly back upwards by the rod 30 until the lip 42 of the detent 41 comes against the pin 40. This arrangement keeps the moving part 26 locked, so that the closing device 7 remains in its active position for as long as the ferromagnetic core 32 is in the attracted position.

When the excitation of the electromagnetic device is cut off, the bush 38, under the action of the spring 39, pushes back the part 26 and the rod 35 of the magnetic device, while releasing the detent 41 from the pin 40. Since part 26 is no longer locked in position, the spring 31 acting upon rod 30 pushes back part 26 upwards to a position beyond the notch containing the piston 29. During this movement, the part 26 pushes up the rod 20 and brings the handle 18 into the position shown in FIG. 1, indicating that the valve is disengaged.

A comparison between FIGS. 1 and 5 shows that the handle 18 comprises a visible indicator of the position occupied by the closing device 7.

Figure 2:
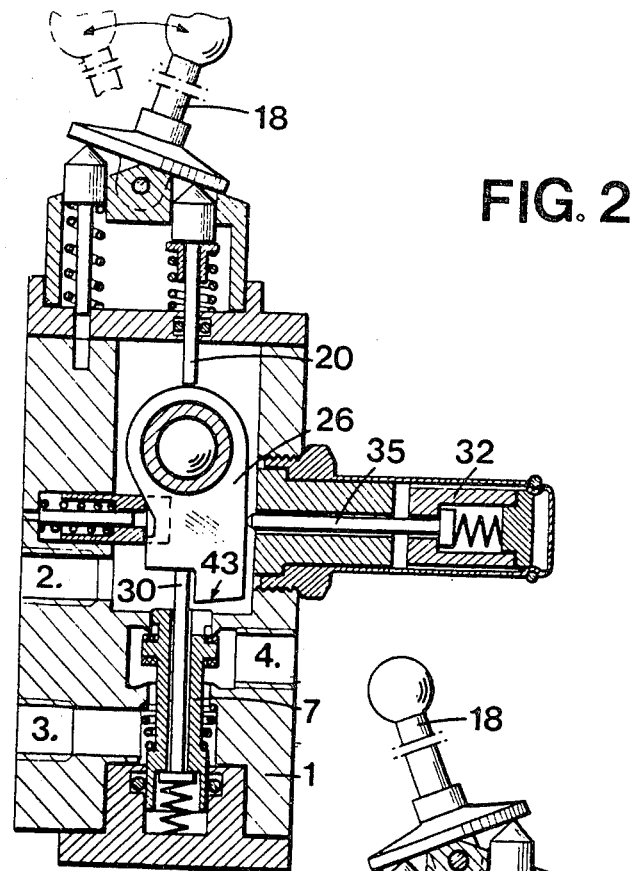
FIGS. 2 to 5 are explanatory diagrams illustrating different operating possibilities of the coupling device.

FIG. 2 illustrates what happens when the handle 18 is operated before the excitation of the electro-magnetic device. The operation of the handle 18 causes the moving part 26 to move downwards, but its bearing surface 43 does not come into contact with the end of the rod 30, but passes to the side of it. If, at this moment, it is decided to excite the electro-magnetic device, the valve still cannot be engaged and the rod 35 tends to cause the part 26 to pivot, which presses up against the rod 30 on the one hand and against the bush 38 on the other hand. If the handle 18 is returned to the position shown in FIG. 1, with the electromagnetic device still excited, the moving part 26 remains in the position shown in FIG. 2, since the piston 29 and the spring 5 will only push part 26 upwards with insufficient force to overcome the restraint upon this part of the rods 30 and 35 and of the bush 38. It is therefore necessary to cut off the excitation of the electromagnet device in order to bring the fluid valve into its initial state as required.

It is hardly necessary to say that numerous constructional modifications can be envisaged, and that in particular, the part 26 could be pivoted about a pin in a sliding component 27. Similarly, the locking device formed by the pin 40 and the detent 41 could be replaced by a spring catch mounted either on the part 26, or on the valve body 1.

In the example described, the excitation of the winding was shown as a necessary pre-condition for the operation of the valve, but it is clear that by a simple modification of the electro-magnetic circuit, the reverse effect could be achieved: namely, that the presence of the excitation current would prevent the manual operation of the valve, which could then only be operated in the absence of current.

I claim:

1. A manually controlled fluid valve comprising manual control means, obturating means located in a valve body and movable between first and second positions, means to provide a returning force on the obturating means when in the first position, connecting means to mechanically connect the obturating means to the manual control means and comprising at least one moving part operated on by electromagnetic means to control engagement and disengagement between the connecting means and the obturating means, said moving part cooperating with spring loaded means for engaging the obturating means in a predetermined position of the manual control means and being acted on by locking means which operate to keep the moving part engaged with the obturating means when in a predetermined one of said first and second positions, said locking means being activated by simultaneous excitation of the electromagnetic means and the placing of the moving part into a position corresponding to the first position of the obturating means, said moving part being axially movable and provided with means for articulation about a transverse axis for pivotal movement between first and second angular positions and arranged to engage said spring loaded means in the first angular position, said moving part being pivoted into the first angular position by operation of said electromagnetic means, said locking means comprising a first stop located in said valve body, and a second stop located on said moving part, said first stop being engaged by the second stop in said first angular position and being disengaged therefrom in said second angular position, which allows said manual control means to move freely and to displace said moving part without actuating said obturating means, said first stop comprising a pin, a sliding bush in which said pin is located, a spring acting on said bush, said second stop comprising a detent provided with a lip and located on said moving part, said spring acting to urge said sliding bush against said detent, wherein pivoting of the moving part into said first angular position in response to operation of said electromagnetic means causes the detent to push the sliding bush against the action of the spring, with axial movement of the moving part causing the detent to pass over the pin until the lip is checked by the pin.

2. A manually controlled fluid valve comprising manual control means, obturating means located in a valve body and movable between first and second positions, means to provide a returning force on the obturating means when in the first position, connecting means to mechanically connect the obturating means to the manual control means and comprising at least one moving part operated on by electro-magnetic means to control engagement and disengagement between the connecting means and the obturating means, said moving part including spring loaded means for engaging the obturating means in a predetermined position of the manual control means and being acted on by locking means which operate to keep the moving part engaged with the obturating means when in a predetermined one of said first and second positions, said locking means being activated by simultaneous excitation of the electromagnetic means and the placing of the moving part into a position corresponding to the first position of the obturating means, said moving part being axially movable and provided with means for articulation about a transverse axis for pivotal movement between first and second angular positions and arranged to engage said spring loaded means in the first angular position, said moving part being pivoted into the first angular position by operation of said electro-magnetic means, said valve body including internal wall surfaces which define a hollow space including a rectilinear groove in the interior of said valve body to house said connecting means, said moving part including a bush coaxial with said transverse axis and containing two balls in contact with each other, one of said balls engaging said groove and the other ball being in contact with a portion of said internal wall surface lying opposite said groove, a spring-loaded device being located in said groove and cooperating with one of said balls to push said moving part upwardly against said manual control means and said manual control means being able to move freely and to displace said moving part without actuating said obturating means when the moving part is in the second angular position.

3. A manually controlled fluid valve comprising a body including a hollow space therein, a closing device mounted in said body and movable from a first to a second position, a control rod for operating said closing device against the action of a return spring, manual control means, an electrically controlled connection device connecting said closing device to said manual control means, said connection device comprising at least one movable part for making and breaking the mechanical connection between said closing device and said manual control means, an electromagnetic device controlling the positioning of said movable part, said movable part being movable in an axial direction relative to said body and pivoted on an axis transverse to said axial direction so as to pivot between two angular positions which make it possible for said movable part to engage or not engage said control rod which operates said closing device, said electromagnetic device acting on said movable part to cause it to pivot into its position of engagement of disengagement with said control rod, said movable part mounted on at least two balls housed in said hollow space of the body so as to guide said movable part during its longitudinal movement and to serve as an axis therefore during its pivotal movements and said manual control means being able to move freely and to displace said moving part without actuating said closing device when the movable part is disengaged from said control rod and locked in one of said angular positions.

4. A manually controlled fluid valve according to claim 3 wherein, said hollow space is provided with a longitudinal groove for guiding at least one of said balls.

* * * * *